(No Model.)  2 Sheets—Sheet 1.
M. BLUMER.
VEGETABLE CUTTER AND SLICER.
No. 461,731. Patented Oct. 20, 1891.
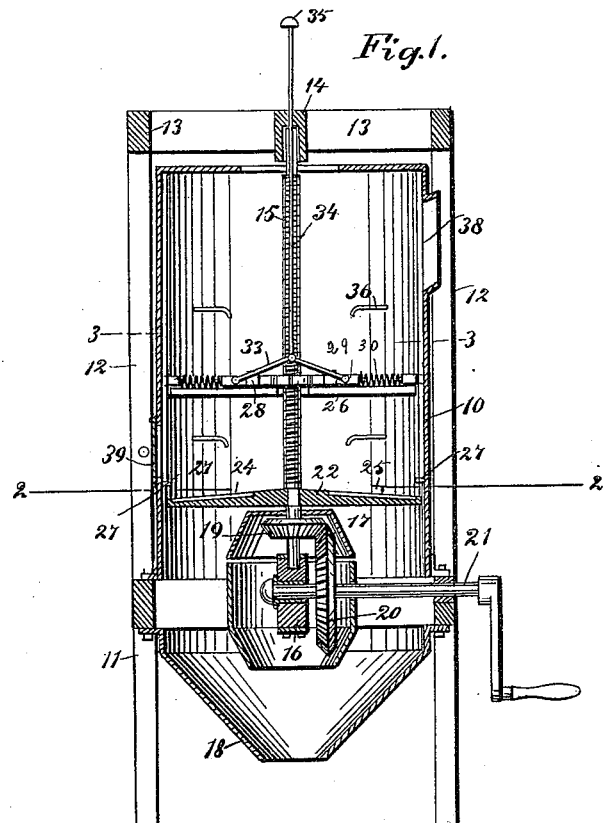
Fig. 1.
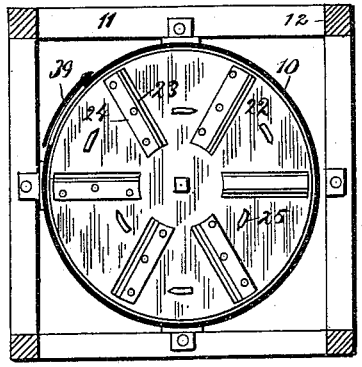
Fig. 2.
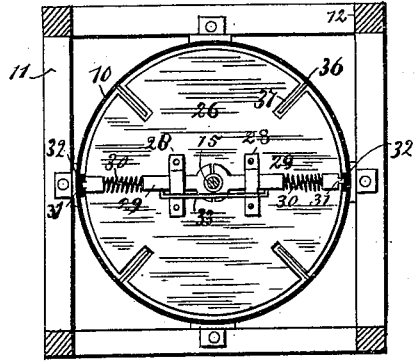
Fig. 3.
Fig. 4.
WITNESSES:
F. McArdle,
C. Sedgwick
INVENTOR:
M. Blumer
BY Munn & Co.
ATTORNEYS (No Model.) 2 Sheets—Sheet 2.
M. BLUMER.
VEGETABLE CUTTER AND SLICER.
No. 461,731. Patented Oct. 20, 1891.
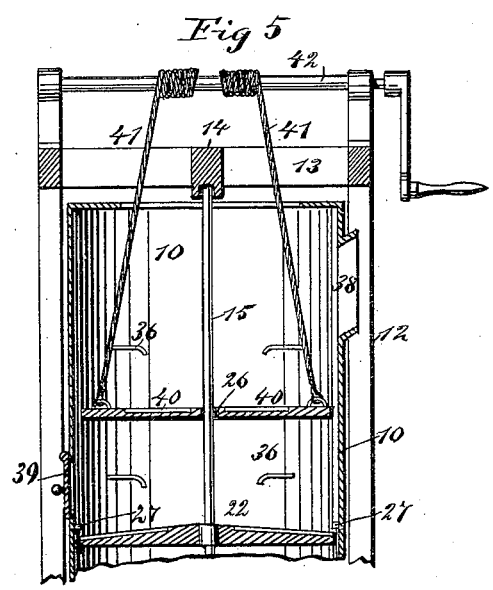
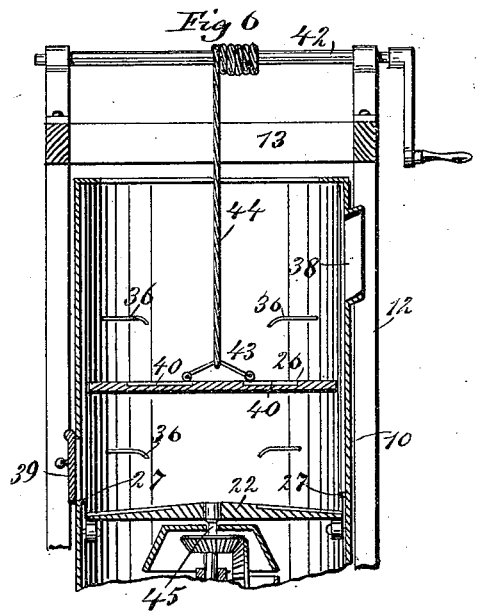
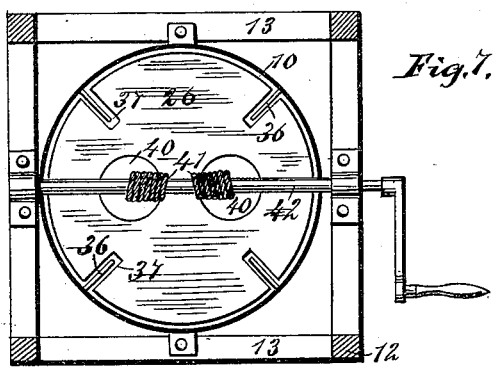
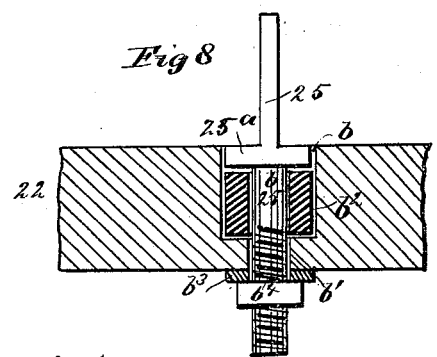
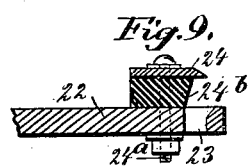
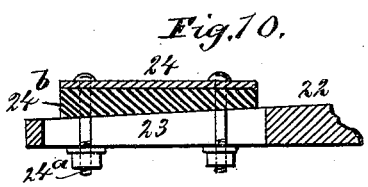
WITNESSES:
F. McArdle.
C. Sedgwick
INVENTOR:
M. Blumer
BY Munn & Co.
ATTORNEYS

UNITED STATES PATENT OFFICE.

MATHIAS BLUMER, OF SHELBY, WISCONSIN.

VEGETABLE CUTTER AND SLICER.

SPECIFICATION forming part of Letters Patent No. 461,731, dated October 20, 1891.

Application filed April 22, 1891. Serial No. 389,974. (No model.)

*To all whom it may concern:*

Be it known that I, MATHIAS BLUMER, of the town of Shelby, in the county of La Crosse and State of Wisconsin, have invented a new and useful Improvement in Vegetable Cutters and Slicers, of which the following is a full, clear, and exact description.

My invention relates to an improvement in vegetable cutters and slicers, and has for its object to provide a simple and economic machine by which vegetables or fruit may be sliced or minced in a convenient and expeditious manner; and the invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a central vertical section through one form of the machine. Fig. 2 is a transverse section on the line 2 2 of Fig. 1. Fig. 3 is a similar section on the line 3 3 of Fig. 1. Fig. 4 is a detail perspective view of one of the horizontal knives. Fig. 5 is a partial vertical section through a modified form of the machine. Fig. 6 is a similar view of a further modification. Fig. 7 is a plan view of the modification shown in Fig. 5. Fig. 8 is a vertical section through a portion of the cutting-disk, illustrating the construction of one of the vertical knives contained therein. Fig. 9 is a transverse section through one of the horizontal knives in position on the disk, and Fig. 10 is a longitudinal section through one of the said knives.

The body of the machine consists of a casing 10, preferably circular in cross-section and having an open bottom and a partially-closed top. The body-casing is secured in any suitable or approved manner upon a base-frame 11. Standards 12 are projected upward from the base-frame, which standards are connected at their upper ends by cross-beams 13, extending over the top of the body-casing. Across the central portion of the upper end of the body-casing, which is provided with an opening, a beam 14 is located, in which beam the upper end of a shaft 15 is journaled. The shaft 15, as shown in Fig. 1, is a screw-shaft and extends downward centrally within the body-casing to the lower end thereof, and the lower extremity of the shaft is journaled in a bearing 16, located in and attached to a cage 17, which cage is supported in any suitable manner by attachment to the base-frame 11. The upper portion of the cage extends upward a little distance within the body-casing, and the lower end, which is open, extends downward within a funnel 18, attached to the under surface of the base-frame, the said funnel constituting the bottom of the device. The screw-shaft 15 is provided at its lower end with a bevel-pinion 19, located within the cage, the said pinion meshing with a bevel-gear 20, also located within the cage and fast upon the drive-shaft 21, which shaft may be revolved by means of a crank or the equivalent thereof. Immediately above the cage a disk 22 is firmly attached to either the screw-shaft or the plain shaft, as shown in Figs. 1 and 5. The upper face of the disk is beveled from the center in direction of its periphery, and a series of radial openings 23 is produced at predetermined intervals apart in the disk, while adjacent to each of the openings a horizontal knife 24 is secured to the disk by means of set-screws 24ª or their equivalents, and between the knives and the upper face of the disk rubber blocks 24ᵇ are preferably located, through which the set-screws pass, the knives being so placed that their cutting-edges extend over the blocks and also some distance over the openings, as illustrated in Fig. 9.

In addition to the horizontal knives 24, which may be adjusted to cut either a thick or a thin slice, vertical knives 25 are employed, which knives are located upon the upper face of the disk between the knives, and the vertical knives are curved in cross-section in such manner that their outer convexed surfaces are concentric with the periphery of the disk, as shown in Fig. 2. The vertical knives 25 may be removed, if desired, and may be adjusted to extend either above the disk at different distances or may be placed to extend below it if in practice it is found desirable. The adjustment of the vertical knives is illustrated in Fig. 8, in which it will be observed that each knife is provided with a collar 25ª at its base and a threaded shank $25^b$ integral with the collar, which shank passes downward through a recess $b$ in the disk and through an opening $b'$, leading into the said recess from the under side of the disk. Within the recess $b$ a rubber packing $b^2$ is located, surrounding the shank of the knife, against which the collar $25^a$ of the knife has a bearing. A washer $b^3$ is slipped over the threaded end of the knife-shank, engaging with the under face of the disk, and a lock-nut $b^4$ is screwed upon said shank and engages with said washer. A second plain disk 26, which is adapted to serve as a presser cap or plate, is loosely mounted upon the shaft 15 above the knife-disk, and the presser disk or cap is prevented from coming in engagement with the knife-disk by placing lugs 27 upon the interior of the body-casing, upon which lugs the presser-disk is adapted to rest when in its lowest position.

In one form of the machine—that illustrated in Figs. 1 and 3—at each side of the center of the presser-disk a strap 28 is located, and bolts 29 are passed through the strap, being free to slide upon the upper face of the disk. Each bolt is made in two sections connected by a spring 30, and upon the outer end of each bolt a stud 31 is formed, which stud enters slideways 32, formed vertically in the inner face of the casing. The inner end of each bolt is semicircular and the said surface is threaded, whereby when the bolts clasp the threaded shaft 15 and the shaft is revolved the presser-disk may be carried downward or upward without revolving. The bolts 29 are connected by links 33 and the links are pivotally connected to the lower end of a rod 34, which extends upward through the beam 14 of the frame and is provided at its upper end with a preferably adjustable knob 35.

From the inner face of the body-casing a series of hooks 36 is horizontally projected, and slots 37 are produced in the periphery of the presser-disk adapted to receive said hooks, as shown in Fig. 3. The hooks are so arranged that one of them will always be in one of the slots 37, and thus prevent the presser-disk from revolving.

An opening 38 is made in one side near the upper end of the body-casing, and a second opening covered by a door 39 is produced near the bottom of the casing, the position of the lower opening being such that the operator may reach through it and adjust the knives upon the knife-disk.

In the operation of the machine, as illustrated in Figs. 1 and 2 and also in Fig. 3, if the vegetables are to be cut in slices only the vertical knives are removed, the presser-disk is carried upward until it is above the opening 38, and the desired quantity of vegetables is placed in the body-casing through the opening 38, whereupon the said vegetables fall upon the knife-disk 22. After the desired quantity of vegetables has been placed in the body-casing the rod 34 is drawn upward, which disengages the bolts 29 from the screw-shaft and the pressure-disk is pushed downward until it rests upon the top of the vegetables. The rod 34 is thereupon again manipulated to cause the bolts to engage with the screw-shaft. When the drive-shaft 21 is turned, the screw-shaft is also revolved and likewise the knife-disk attached to it, and the knives of the disk cut the vegetables engaging with them, cutting from the bottom of the mass, and the slices pass downward through an opening 23 in the disk into the funnel 18, and from thence into any receptacle placed to receive them. As the vegetables are sliced and discharged from the body-casing, the screw-shaft will constantly feed the presser-disk downward, whereby the vegetables during the operation of slicing will at all times be tightly pressed between the presser and the knife-disks. After all the vegetables have been sliced the presser-disk may be carried upward by reversing the movement of the shaft 21. When the vegetables are to be minced, the vertical knives are placed in position in the lower disk and act in conjunction with the horizontal knives, the cuts being at a right angle to each other.

In Fig. 5 it will be observed that the screw-shaft is substituted by a plain shaft and that the clamping-bolts are omitted. The presser-disk in this case is provided in its upper surface with two or more cavities 40 for the reception of weights, and the disk is raised and lowered through the medium of ropes or chains 41, secured to the presser-disk near opposite edges and to a winding-shaft 42, located at the top of the machine.

The shaft 15 may be entirely omitted, if desired, in which event a bail 43 is preferably secured to the upper face of the presser-disk at each side of its center, and a single rope or chain 44 connects said bail with the winding-shaft 42, as illustrated in Fig. 6. When the shaft 15 is omitted, the knife-disk is secured to the upper end of a short vertical shaft 45, which shaft is driven through the medium of the drive-shaft in the manner illustrated in Fig. 1.

Having thus described my invention, I claim as new and desire to secure by Letters Patent—

1. In a vegetable-cutter, the radially-slotted cutting-disk provided with knives projecting over its slots, elastic blocks or cushions interposed between the knives and disk and closing the spaces between the adjacent faces thereof to direct the cut material down through the slots, and adjusting-bolts passed through knives, blocks, or cushions and disk, substantially as set forth.

2. In a vegetable cutter and slicer, the combination, with a casing, a drive-shaft, a vertical driven shaft located in the casing, a disk secured to the driven shaft, having an inclined upper face and provided with a series of radial openings, knives horizontally located upon the disk and partially covering the openings therein, and vertically-adjustable and removable knives also attached to the disk, of a presser-disk located above the knife-disk, spring-controlled bolts attached to the presser-disk and entering ways in the casing, and a hoisting mechanism, substantially as described, whereby the presser-disk is raised and lowered to and from the knife-disk, as and for the purpose set forth.

3. The combination, with the disk having a vertical recess $b$ in its upper or outer face and an aperture $b'$ in the bottom thereof, of the vertical knife 25, having a collar $25^a$, a shank $25^b$, an elastic block or cushion $b^2$ on the shank below the collar and within said recess, and the nut on the lower end of the shank, substantially as set forth.

4. The combination, with the casing, the rotary cutting-disk, and the screw-shaft, of the follower or presser traveling freely on the screw-shaft and provided with means to prevent its rotation, a two-part bolt mounted on the follower, with its inner or nut-forming ends engaging the said screw, and means for holding the said inner ends in engagement with the threads of the screw-shaft, substantially as set forth.

5. In a vegetable cutter and slicer, the combination, with a casing, a drive-shaft, a driven screw-shaft connected with the drive-shaft, and a disk secured to the screw-shaft, provided with a beveled upper face having radial openings in said face and knives extending over the openings, of a presser-disk loosely mounted upon the screw-shaft, spring-controlled bolts having threaded inner ends engaging with the shaft and lugs at their outer ends fitted in slideways in the casing, and a mechanism, substantially as described, for manipulating the bolts, as and for the purpose specified.

MATHIAS BLUMER.

Witnesses:
CHARLES E. SERVIS,
M. P. WING.